Oct. 22, 1935. K. M. LEDERER Re. 19,735

MILLIVOLTMETER

Original Filed July 6, 1932

Inventor:

Karl M. Lederer,

By Byrne, Townsend & Cotter,

Attorneys.

Reissued Oct. 22, 1935

Re. 19,735

UNITED STATES PATENT OFFICE 19,735

MILLIVOLTMETER

Karl M. Lederer, Newark, N. J., assignor to Weston Electrical Instrument Corporation, Newark, N. J., a corporation of New Jersey Original No. 1,958,006, dated May 8, 1934, Serial No. 621,085, July 6, 1932. Application for reissue August 30, 1935, Serial No. 38,663

2 Claims. (Cl. 171—95)

Figure 1:
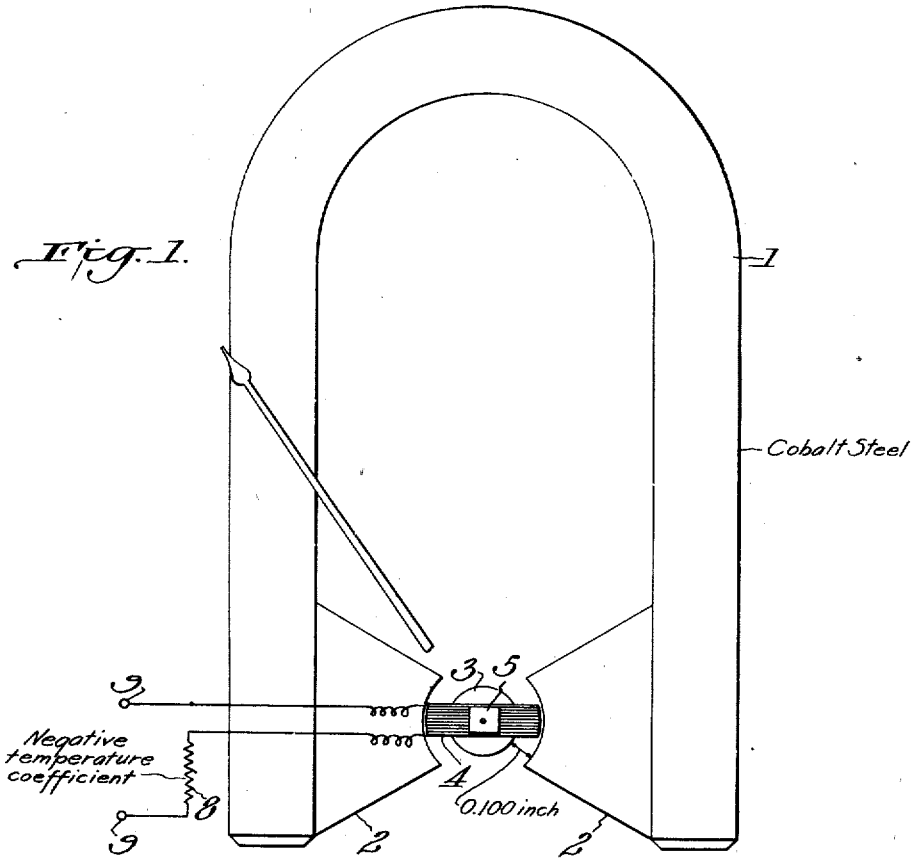

This invention relates to electrical measuring instruments, and particularly to millivoltmeters of high sensitivity such as are employed with thermocouples for the measurement of temperature.

Since the voltage developed by a thermocouple is quite small, a relatively high torque can be developed only by the use of a large number of turns on the moving coil. According to the previous practice, however, the coil must be wound with exceedingly fine wire as the gap between the pole pieces and the core could not be much more than about 0.05 inch even when the developed length of the tungsten steel magnet was as great as from 8 to 12 inches. But the increased resistance of the finer wire required for an increased number of turns offsets the advantages theoretically obtained by the increased turns. Furthermore, in millivoltmeters of the known type, it was necessary to obtain high accuracy in the mounting of the core and moving system to secure uniform scale graduations, since any slight inequality in the air gap results in a considerable variation in the field strength at different portions of the gap.

It as been proposed to employ cobalt steel in place of tungsten steel in the manufacture of electrical measuring instruments of the permanent field magnet type, and this type of cobalt steel magnet instrument has been characterized by the relatively short length and light weight of the field magnet. The term "cobalt steel" is used to designate steel particularly adapted for the manufacture of permanent magnets and exhibiting, when suitably hardened, a coercive force of the order of upward of 100, thereby distinguishing from the ordinary chrome and tungsten magnet steels which have a coercive force of only about 60. Due to the higher coercive force and retentivity of good grades of cobalt steel, it has been possible to reduce the developed length of the magnet while retaining the same field strength for a given pole, core and coil construction.

While this decrease in the length and weight of the permanent magnet of a measuring instrument is decidedly advantageous in some instances, it has not resulted in any substantial change in the performance or characteristics of the instruments.

According to the present invention, the permanent field magnet is formed of a steel having the high coercive force which is characteristic if cobalt steel is employed but no attempt is made to obtain a substantial reduction in the size of the magnet. The operation characteristics of the instrument are improved, however, by increasing the radial length of the air gap to values substantially in excess of those which are practical with other magnet steels. Increasing the air gap is advantageous in many ways. Slight variations in the width of the gap do not result in distorted scales, and lighter coil systems are possible as the copper wire may be replaced by aluminum.

Objects of the invention are to provide millivoltmeters of greater sensitivity and which may be manufactured commercially with more uniformity than the known types. More specifically, an object is to provide sensitive milliammeters in which the air gap is substantially greater than has been heretofore possible. A further object is to provide a milliammeter in which the moving system is of relatively light weight but develops a higher torque than that obtainable with known constructions. A further specific object is to provide a sensitive millivoltmeter particularly adapted for use with a thermocouple, and which includes elements which automatically compensate for variations in the temperature of the cold junction of the thermocouple.

Figure 2:
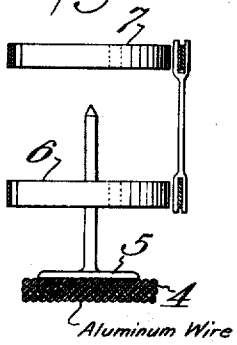
Figure 3:
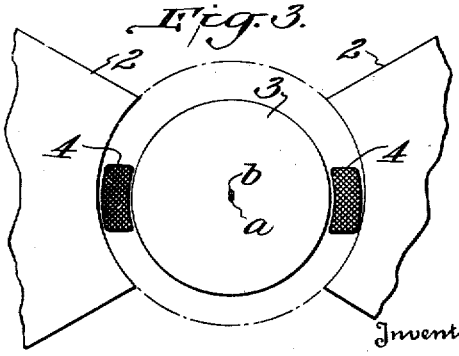

These and other objects of the invention will be apparent from the following specification when taken with the accompanying drawing, in which, Fig. 1 is a fragmentary plan view of an instrument embodying the invention, Fig. 2 is a fragmentary sectional view of the upper part of the moving coil system, and Fig. 3 is an enlarged diagrammatic view, in plan, of the pole pieces and core.

In the drawing, the numeral 1 identifies the elongated magnet of a sensitive voltmeter, the magnet being formed of a material having a coercive force of the order of that of cobalt steel and having pole pieces 2 which may be integral with the magnet or formed of soft iron and secured thereto. A core 3 and winding 4 are mounted in the air gap, the winding 4 being preferably of the formless type and having mounting brackets 5 secured thereto by a suitable adhesive. Formless windings are, as is well known in the art, wound on arbors and the turns are rendered self-supporting by the use of adhesives or cement, thus avoiding the use of metallic frames which would damp the movement of the winding.

The radial length of the winding 4 may be substantially in excess of anything heretofore possible, and the winding may therefore be formed of an enamel-coated aluminum wire. Due to the increased number of turns of the winding, the torque developed is such that it is practical to anchor the end of the movement spring 6 to a temperature-compensating bi-metallic spring 7, and not directly to the bridge as has been the prior practice. The bi-metallic spring functions as an automatic zero corrector and compensates for variations in the temperature of the cold junction of the thermocouple.

The torques developed by the known types of low-range millivoltmeters employing tungsten or chrome steel magnets have been of such low order of magnitude that it has not been practical to form small bi-metallic compensating springs for such instruments.

To compensate for the temperature variation of the resistance of the moving coil 4, a resistance 8, having a negative temperature coefficient, is serially connected between the instrument terminals 9 and the coil. As compared with low range millivoltmeters having a comparable low external circuit resistance, the accuracy of the readings is rendered substantially independent of temperature when the external resistance 8 takes the form of a silicon carbide resistor.

This compensation by means of a resistance having a negative coefficient is particularly useful when, in accordance with the invention, the air gaps are so increased that the number of turns and the resistance of the moving coil are relatively large. In the absence of compensation, the errors due to temperature variations increase directly as the resistance, at zero, of the coil, and precision work with sensitive high resistance millivoltmeters has been possible only by maintaining the instrument at a constant temperature or by the use of temperature correction tables. By compensating for the resistance variations due to temperature changes, the coil may have either a high or a low resistance, according to the particular design requirements in any given case.

According to the prior practice, the maximum total air gap that could be employed with elongated magnets of tungsten or chrome steel was about 0.100 inch, i. e., the gap between the core 3 and the pole faces was not in excess of 0.050 inch. With longer air gaps, the magnets did not have the required permanency. With an air gap of this magnitude the radial length of the coil form for receiving the instrument winding was usually about 0.01 inch, though it could be increased to possibly 0.030 inch by taking extreme precautions in the accurate construction, assembly and adjustment of the parts.

In accordance with the present invention, advantageous use is made of the greater coercive force and retentivity of cobalt steel and like materials by giving the air gap the increased length which, with equal permanency, is made possible by substituting a cobalt steel magnet for the old types of tungsten or chrome steel.

For approximately the same field strength, each gap may be made of the order of 0.100 inch, thus more than doubling the space available for the moving coil, and the radial length of the winding may be as high as 0.70 inch. With this increased length, a greater number of turns of copper wire may be used to increase the sensitivity but lighter materials, such as the drawn aluminum and aluminum alloys, commonly known under the general term "aluminum wire", are preferably employed to obtain a moving system of minimum weight. By the use of aluminum wire, the weight of the coil may be reduced below that of the old forms of copper winding and, at the same time, the number of turns may be increased by as much as fifty percent and more.

The increased air gap has the further advantage that slight variations in the construction or the adjustment of the pole pieces, core and winding do not result in marked variations in the uniformity of the scale graduations. As indicated in Fig. 3, the axis *a* of the core may be displaced from the axis *b* of the pole pieces by an appreciable amount which may be as great as 0.005 inch. The resultant variation in the reluctance at different parts of the air gap would be at least 20 percent with a tungsten steel magnet instrument having a total air gap of not more than 0.100 inch, and, with a cobalt steel instrument constructed in accordance with the invention, the variation would be 10 percent when the total air gap is 0.200 inch, and could be further reduced with a slightly larger air gap.

I claim:

1. In a millivoltmeter, the combination of a magnet formed of steel having a coercive force of the order of upward of 100 and having spaced pole pieces, a core positioned between said pole pieces, and a moving system including a coil consisting of a winding of aluminum wire pivotally mounted in the air gaps between said core and said pole pieces, said magnet having a length resulting in a substantially permanent field when each of said air gaps has a radial length of the order of substantially more than 0.05 inch.

2. A millivoltmeter as claimed in claim 1, in combination with a silicon carbide resistance in series with said aluminum winding.

K. M. LEDERER.